(12) United States Patent
Bailey

(10) Patent No.: US 7,650,168 B2
(45) Date of Patent: *Jan. 19, 2010

(54) VOICE ACTIVATED DIALING FOR WIRELESS HEADSETS

(75) Inventor: William Bailey, Lithonia, GA (US)

(73) Assignee: AT&T Intellectual Property I, L.P., Bedminster, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 11/868,690

(22) Filed: Oct. 8, 2007

(65) Prior Publication Data

US 2008/0194301 A1    Aug. 14, 2008

Related U.S. Application Data

(63) Continuation of application No. 11/496,257, filed on Jul. 31, 2006, now Pat. No. 7,280,849.

(51) Int. Cl.
    *H04M 1/00*    (2006.01)
(52) U.S. Cl. .................. 455/563; 455/556.1; 455/557; 455/569.1
(58) Field of Classification Search ............. 455/412.1, 455/412.2, 414.1, 403, 404.1, 556.1, 557, 455/569.1, 563, 575.2; 704/246, 270.1, 275, 704/201; 381/74, 384

See application file for complete search history.

(56) References Cited

U.S. PATENT DOCUMENTS

| 5,721,783 | A | 2/1998 | Anderson |
|---|---|---|---|
| 6,714,233 | B2 | 3/2004 | Chihara et al. |
| 7,072,686 | B1 | 7/2006 | Schrager |
| 2003/0100274 | A1* | 5/2003 | Brown .................. 455/90 |
| 2003/0161292 | A1* | 8/2003 | Silvester .............. 370/349 |
| 2004/0242278 | A1 | 12/2004 | Tomoda et al. |
| 2005/0037818 | A1 | 2/2005 | Seshadri et al. |
| 2005/0202844 | A1 | 9/2005 | Jabri et al. |
| 2005/0272477 | A1 | 12/2005 | Boykins et al. |
| 2006/0046656 | A1 | 3/2006 | Yang |
| 2006/0165243 | A1 | 7/2006 | Lee |
| 2006/0217967 | A1 | 9/2006 | Goertzen et al. |
| 2007/0094028 | A1 | 4/2007 | Lu et al. |

OTHER PUBLICATIONS

Specification entitled, "Cordless Telephony Profile," of the Bluetooth™ Specification, Part K;3, pp. 100 thru 144 of 452, dated Feb. 22, 2001, Version 1.1.

Pamphlet from the Voyager™ Series of Plantronics Sound Innovation, article entitled "Plantronics Voyager™ 510 Bluetooth® Headset", Jan. 2006, 2 pages.

* cited by examiner

Primary Examiner—Jean A Gelin
(74) Attorney, Agent, or Firm—Hope Baldauff & Hartman, LLC

(57) ABSTRACT

A wearable wireless telecommunications headset may include at least a microphone, a speaker, a transceiver, a processor and a memory. The headset processes audio commands from a user, recognizing the commands and executing them appropriately. The headset communicates with multiple communication devices, answering incoming communications from any devices in range and announcing identity information about an initiator of the communication, as well as initiating outgoing communications by recognizing a spoken communications address, or recognizing and looking up a spoken name in a locally or remotely stored address book.

17 Claims, 4 Drawing Sheets

VOICE ACTIVATED DIALING FOR WIRELESS HEADSETS

CROSS REFERENCE TO RELATED APPLICATIONS

This patent application is a continuation of co-pending U.S. Pat. No. 7,280,849, entitled "Voice Activated Dialing for Wireless Headsets," filed on Jul. 31, 2006, which is herein incorporated by reference in its entirety.

BACKGROUND

Wireless headsets are popular devices for active cell phone users. The portability and convenience of wireless headsets have convinced professional and amateur users alike to switch from wired headsets and conventional cell phone speakers and microphones. Wireless headsets generally may include one or more components for transmitting sound (e.g., a speaker), one or more components for receiving sound (e.g., a microphone), and one or more signaling components (e.g., a radio), the combination of these components enabling a user to wirelessly listen to an audio message and/or participate in a conversation.

Conventionally, wireless headsets are used in conjunction with cell phones. A user may, for example, have a cell phone in his or her pocket, the cell phone being simultaneously in communication with both a cell tower and a wireless headset affixed to the user's ear or head. The user may view information associated with a current phone call on a display on either the phone or the headset.

If a user, however, wishes to use the wireless headset with multiple communication devices (e.g., cell phone and work or home phone), existing solutions fall short. Furthermore, if a user wants to receive audio announcement information about an incoming call, again existing solutions fall short. Finally, if a user wants the ability to connect to a remote person or location using audio commands, headset solutions do not handle such commands in as simple and centralized a method as possible.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Provided are wearable wireless telecommunications headsets including a microphone for receiving an audio message, a memory for storing the message, a transceiver for communicating with multiple communication devices, and a processor for recognizing a command associated with the audio message and executing the command by communicating wirelessly with at least one of the communication devices. Such headsets may include a capability for determining a communications address associated with a name provided in the command. The determination may be made using an address book stored in the headset.

Also provided are methods for handling a plurality of communications including associating a wearable wireless headset with a communication device, receiving at the headset an indication to initiate an outgoing communication, and receiving an audio command from the user. The method continues by recognizing the command at the wireless headset, forwarding the recognized command to the communication device initiating the outgoing communication and enabling the user to participate in and terminate the communication.

Other apparatuses, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

Figure 1:
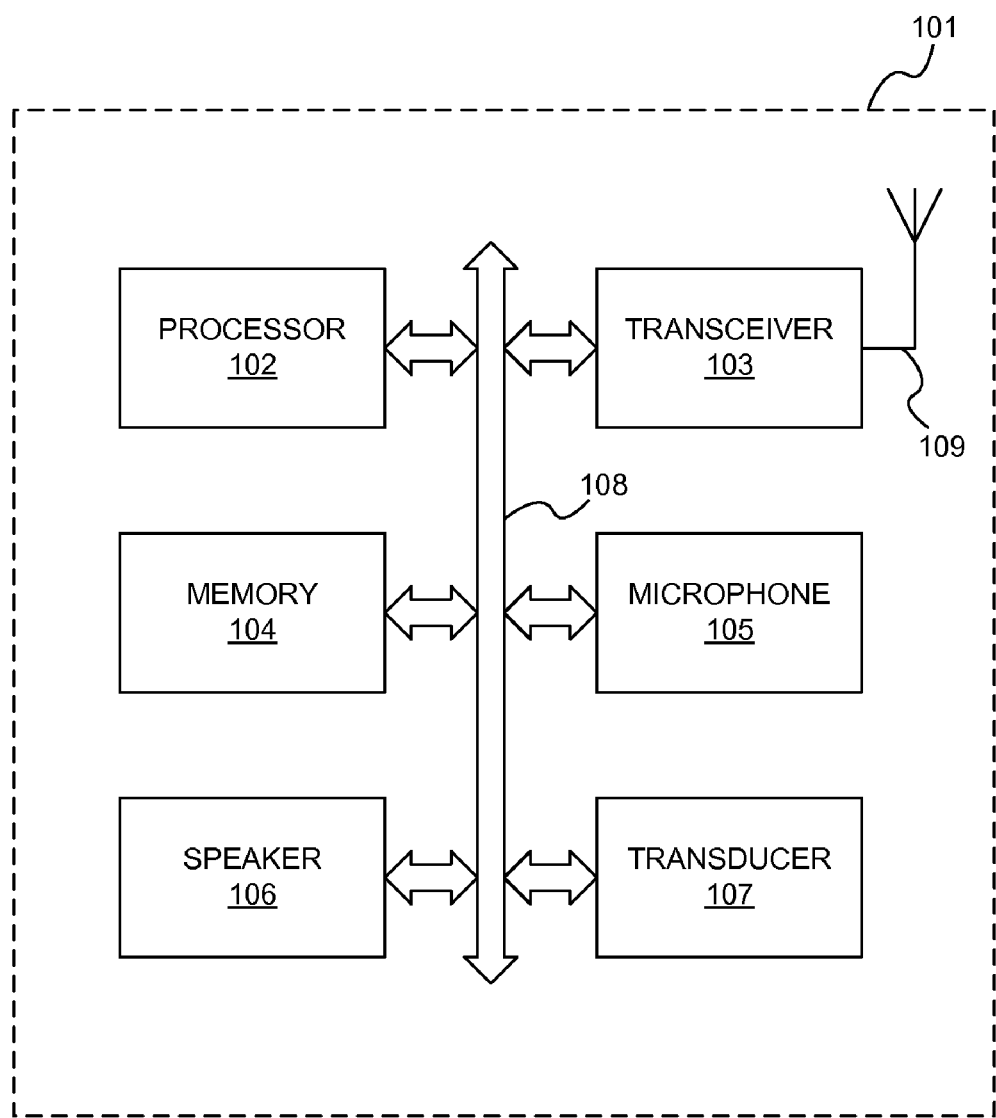
FIG. 1 is a block diagram illustrating functional components that may be found in a wireless telecommunications headset.

The following detailed description is directed to an apparatus and method for receiving and initiating telephone calls. In the following detailed description, references are made to the accompanying drawings that form a part hereof, and which are shown, by way of illustration, using specific embodiments or examples. Referring now to the drawings, in which like numerals represent like elements through the several figures, aspects of the apparatus and methods provided herein will be described.

FIG. 1 is a block diagram illustrating functional components that may be found in a wireless telecommunications headset 101. Headset 101 may be wearable by a user. For example, headset 101 may be formed so as to affix to the head of a user by wrapping around an ear or inserted at least partially within the ear canal, or the headset may include a speaker for each ear and extend over or around the head as with conventional headphones. Headset 101 may also be separated into multiple physical components attached to each other using wired and/or wireless schemes (e.g., separate microphone attached by a wire). Although represented here by distinct blocks, functional components of headset 101 may be combined into a single component (e.g., processor with on-board memory) and/or split into multiple components (e.g., multiple co-processors).

Processor 102 may include a central processing unit, an embedded processor, a specialized processor (e.g., digital signal processor), or any other electronic element responsible for interpretation and execution of instructions and/or performance of calculations. Processor 102 may communicate with, control and/or work in concert with other functional components, including transceiver 103, memory 104, microphone 105, speaker 106, and transducer 107. Communication between components may be facilitated by bus 108. Bus 108 may be inclusive of multiple buses, and or communication paths. Communication may be in the form of multiple parallel paths, a single serial path, or any other communication scheme.

Transceiver 103 is capable of communicating wirelessly with other devices using electromagnetic frequencies broadcast and received using antenna 109. Transceiver 103 may include multiple radios, and antenna 109 may include multiple antennas, each being specialized for different frequencies and/or reception and transmission. Transceiver 103 may include transmitters and/or receivers capable of utilizing radio standards for communicating with remote devices. As an example, transceiver 103 may be enabled to utilize a Bluetooth® radio standard. Radio standards may also include Ultra-Wideband (UWB), Wireless USB (WUSB), Wi-Fi (IEEE 802.11), WiMAX, WiBro, infrared, near-field magnetics, HiperLAN, and so forth.

Memory 104 may be utilized for the storage of electronic data and electronic instructions for use by processor 102. Memory 104 may include one or more types of computing memory, including volatile (powered) and non-volatile forms of memory. Volatile memory are most commonly comprised of integrated circuits and may include various forms of static random access memory (SRAM) and dynamic random access memory (DRAM). Non-volatile memory may include integrated circuit forms of memory such as Flash memory, as well as other categories of memory including magnetic and/or optical forms of data storage. As above, memory 104 may be comprised of a single integrated circuit, or multiple components.

Microphone 105 and speaker 106 may include any form of transducer capable of converting audio waves into electrical signals (as with the microphone) and/or converting electrical signals into audio waves (as with the speaker). Ultimately, these components enable a user of headset 101 to participate in a telephonic conversation, and may also enable the user to provide audio commands and receive audio feedback.

Transducer 107 may provide an additional input method for providing or prompting commands by the user. Transducer 107 may be a button to convert mechanical energy into an electrical signal. Transducer 107 may also include a touch sensor, a motion sensor, a sound sensor, or any other component capable of providing or prompting commands by the user. For purposes of headset 101, the functionality of transducer 107 may be integrated with microphone 105 so as to enable vocal commands or prompts by the user.

Figure 2:
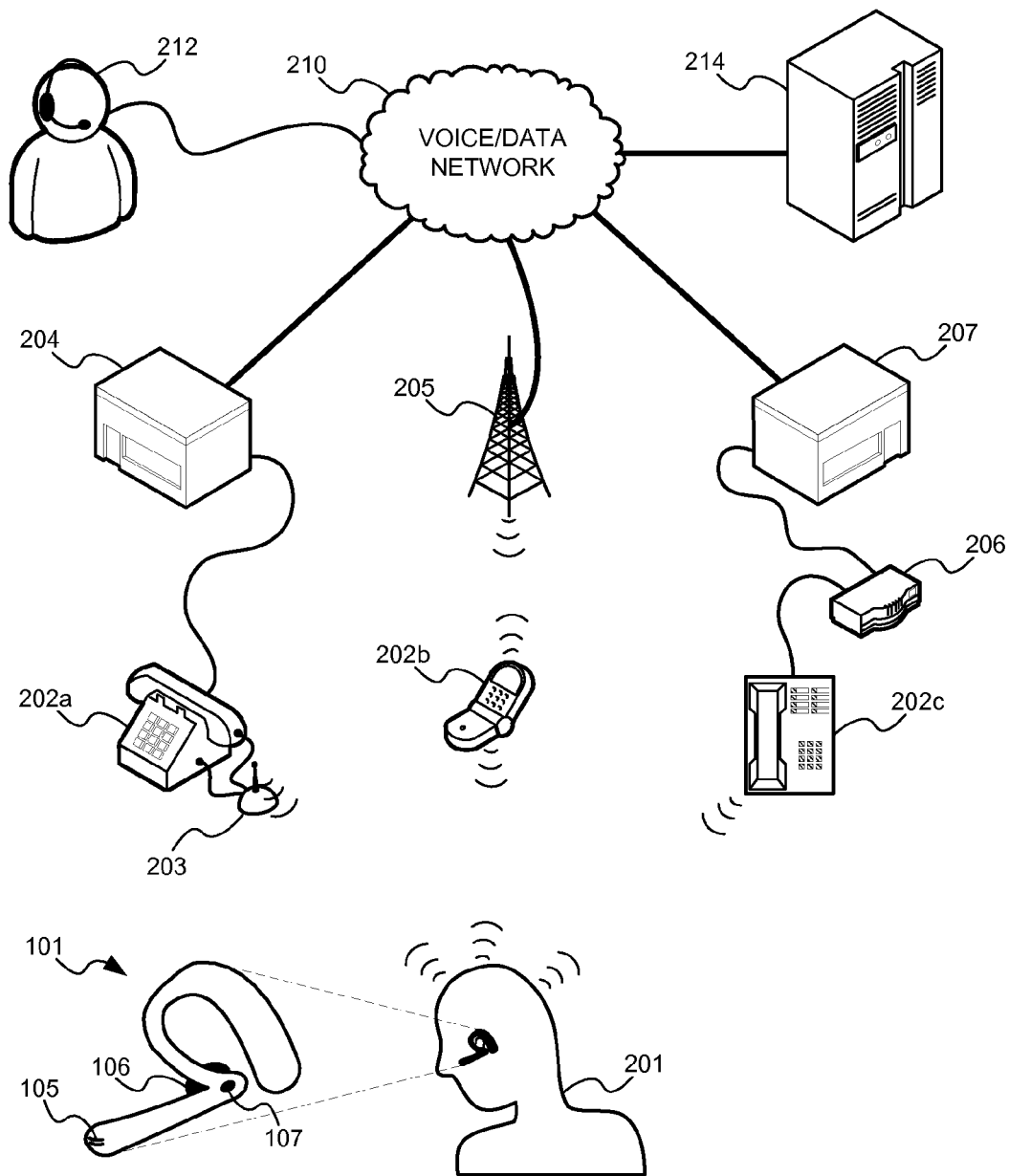
FIG. 2 depicts an example of a wireless telecommunications headset in communication with multiple remote devices.

FIG. 2 depicts an example of wireless telecommunications headset 101 in use with multiple remote devices 202. User 201 may wear headset 101 over one ear. User 201 may speak such that microphone 105 can pick up the user's voice. User 201 may hear synthesized audio feedback from headset 101 as well as the voices of others via speaker 106. User 201 may also prompt or otherwise command headset 101 using button 107.

Headset 101 may be in wireless communication with one or more remote devices 202 simultaneously. Remote devices may include the conventional telephonic devices portrayed here, in addition to other less conventional devices, including personal computers and video-enabled phones. Wireless communication may be in the form a Bluetooth® radio standard, or other wireless standards as discussed above. For example, when user 201 is at home, headset 101 may be connected to home phone 202a via a Bluetooth® wireless connection. User 201 may have already authorized headset 101 to communicate with home phone 202a using an authentication process, such as pairing. Home phone 202a may have wireless networking built in to communicate with headset 101, or the home phone may be connected through a wireless converter 203 which converts wireless signals back and forth into conventional wired telephone signals.

In one embodiment, headset 101 acts as a conduit for audio, acting as a receiver and transmitter of a conversation between user 201 and remote user 212. When user 201 speaks, audio waves are converted to analog electronic signals by microphone 105. The analog signals may or may not be processed by processor 102 to convert them into digital signals by, for example, digital sampling of the analog signal. Either way, signals are transmitted wirelessly by transceiver 103 to wireless converter 203, which may or may not convert digital signals back to analog signals for transmission to home phone 202a, through central office 204, through network 210 and to remote user 212. Network 210 may include a telecommunications network, a packet-switched data network such as the Internet, or any combination of networks used to distribute information such as voice and/or data signals. Likewise signals may return along the same path through the same wireless connection for conversion to audio waves for user 201 to hear.

In another embodiment, headset 101 interprets audio commands delivered verbally by user 201. In this mode, a user may prompt headset 101 to make a call by either speaking a particular word or phrase, or by touching button 107. Headset 101 may then use speech recognition techniques to interpret a verbal command provided by user 201. The command may include a telephone number to be dialed or a name from an address book to be dialed. Once the command is interpreted, headset 101 may act on the command by, for example, transmitting signals to home phone 202a for conversion into dual-tone multi-frequency (DTMF) touch tones. As another example, headset 101 may digitally instruct home phone 202a to dial the recognized telephone number using a standard protocol such as those set forth in the Cordless Telephony Profile of the Bluetooth® Specification. Regardless, in one embodiment, some portion of speech recognition may be performed by headset 101.

In yet another embodiment, headset 101 receives audio command messages delivered verbally by user 201 and forwards at least a portion of the audio message for processing by server 214. The balance of processing between headset 101 and server 214 may vary. For example, headset 101 may process language to extract a most likely candidate command and may include possible alternative candidates. Candidate commands may be passed to server 214 by making a request using a conventional telecommunications audio channel (e.g., headset 101 dials a dedicated number and communicates using a conventional modulated analog signal). Server 214 may access a telephone directory and look up a name from the list of candidate commands passed by headset 101. Server 214 may then reply with a most likely phone number based on look up results.

Once wireless headset 101 determines a phone number associated with the audio message, it may be converted to an audio message itself to be delivered as feedback to user 201 prior to dialing, or it may be automatically dialed without providing feedback. The address book utilized by server 214 may be a global address book (e.g., the telephone white pages), or it may be an address book created by user 201. An address book may include a listing of names and one or more telephone numbers associated with each name. A server-stored address book may be managed and modified utilizing a web interface. Storing a user address book on server 214 may enable a user to store a large address book not constrained by size limitations of memory 104 in headset 101. Storing the address book on server 214 may also simplify management of the address book by making it always accessible via network 210 (e.g., the Internet).

If, in addition to home phone 202a, user 201 also owns cell phone 202b, then the user may wish to utilize wireless headset 101 with both remote devices. Cell phone 202b may be in communication with remote user 212 over network 210 via cellular base station 205. Cell phone 202*b* may include a single or multiple transceivers in order to communicate wirelessly with base station 205 and with headset 101. User 201 may pair headset 101 with cell phone 202*b* without necessarily "un-pairing" or disassociating the headset from home phone 202*a*. In this fashion, headset 101 may be used with either remote device. When making an outgoing call using headset 101, user 201 may have to indicate which device to use if both are in range of the headset. This indication may occur at the time of the call, signaling a choice of device with the depression of button 107, or via audio commands. Alternatively, an indication of priority may have been previously provided, making one remote device preferred over another when both are in range. A list of remote devices in a preferred access order may be stored in memory 104 of headset 101. Another alternative may involve headset 101 weighing the relative strength of the wireless signal between both devices and using the device with the strongest signal to make the outgoing call.

When receiving an incoming call on either home phone 202*a* or cell phone 202*b*, headset 101 may announce that a particular device is ringing, either through a generated voice or particular sounds, or using other feedback mechanisms, such as text on an LCD display or LED lights. Such an announcement may include incoming caller information. For example, an audio announcement of an incoming call may be generated stating, "Home phone is receiving a call from (202) 555-1212." If user 201 is engaged with a call via one remote device (e.g., home phone 202*a*), and an incoming call is received on another remote device (e.g., cell phone 202*b*), then one of a number of actions may be taken. For example, headset 101 may prompt the user as to the call on the other remote device using a generated voice, as with the example above, "Cell phone is receiving a call from (404) 555-4132." Headset 101 may alternatively provide a simple audio prompt (such as a "beep"), to announce a new incoming call, similar to a call waiting tone. Headset 101 may also simply ignore the incoming call. If user 201 is alerted to an incoming call on another remote device, headset 101 may enable the user to place the current call on hold while handling the incoming call from the other device.

Incoming call announcements may be utilized regardless of whether a current call is ongoing. Such announcements may be further determined by announcing a name associated with a call rather than the phone number. For example, the announcement of an incoming call may be, "Cell phone is receiving a call from Joe Smith." The name information associated with a call may simply be pulled from standard Caller ID information associated with the incoming call. Name information may also be determined by performing a reverse lookup of the incoming telephone number in an address book. For example, if user 201 has an address book stored in memory 104 of headset 101, the headset may analyze the incoming caller information and perform a lookup based on the incoming telephone number. Once an associated name is determined, the name can be made part of the vocal announcement played out of speaker 106 on headset 101. At which point, a user can decide whether or not to answer the incoming call using an audio command spoken into microphone 105, or by depressing button 107, or by other input methods.

Headset 101 may also be pairable with additional remote devices, including office phone 202*c*. Office phone 202*c* may have a wireless radio standard built in (e.g., Bluetooth® functionality included with the device). Headset 101 may once again utilize incoming call announcements for incoming calls associated with office phone 202*c*. Headset 101 may also utilize one of the priority schemes identified above when making outgoing calls in the presence of office phone 202*c* and cell phone 202*b*. In a situation where both remote devices receive incoming calls at the same time, headset 101 may permit user 201 to choose which call to answer using button 107 or an audio command, or the headset may utilize a priority scheme similar to the schemes described above, including having previously identified one device (e.g., office phone 202*c*) having priority over another (e.g., cell phone 202*b*) for incoming calls. Alternatively, headset 101 may simply compare the relative wireless signal strengths of the connections to both devices and choose the strongest signal when deciding which incoming call to connect.

Calls associated with office phone 202*c*, or with any remote device, may be routed using Voice over Internet Protocol (VoIP) technology using device 206, which may include a router, gateway, digital subscriber line (DSL) modem, and/or cable modem. Such calls may be routed via the Internet rather than a conventional telephone network, via central office 207. Central office 207, although conventionally associated with telecommunications providers, may include a facility owned by any Internet service provider, including providers of cable Internet. Moreover, although the remote device 202*a* is depicted as a home telephone, device 202*b* is depicted as a cell phone, and device 202*c* is depicted as an office phone for ease of illustration, it should appreciated that these devices may include any type of remote device communicating via the voice/data network 210 via any suitable communication network. Also, although telephone numbers are described above for ease of explanation, it should be appreciated that the invention may be applicable to any type of communication address.

Figure 3:
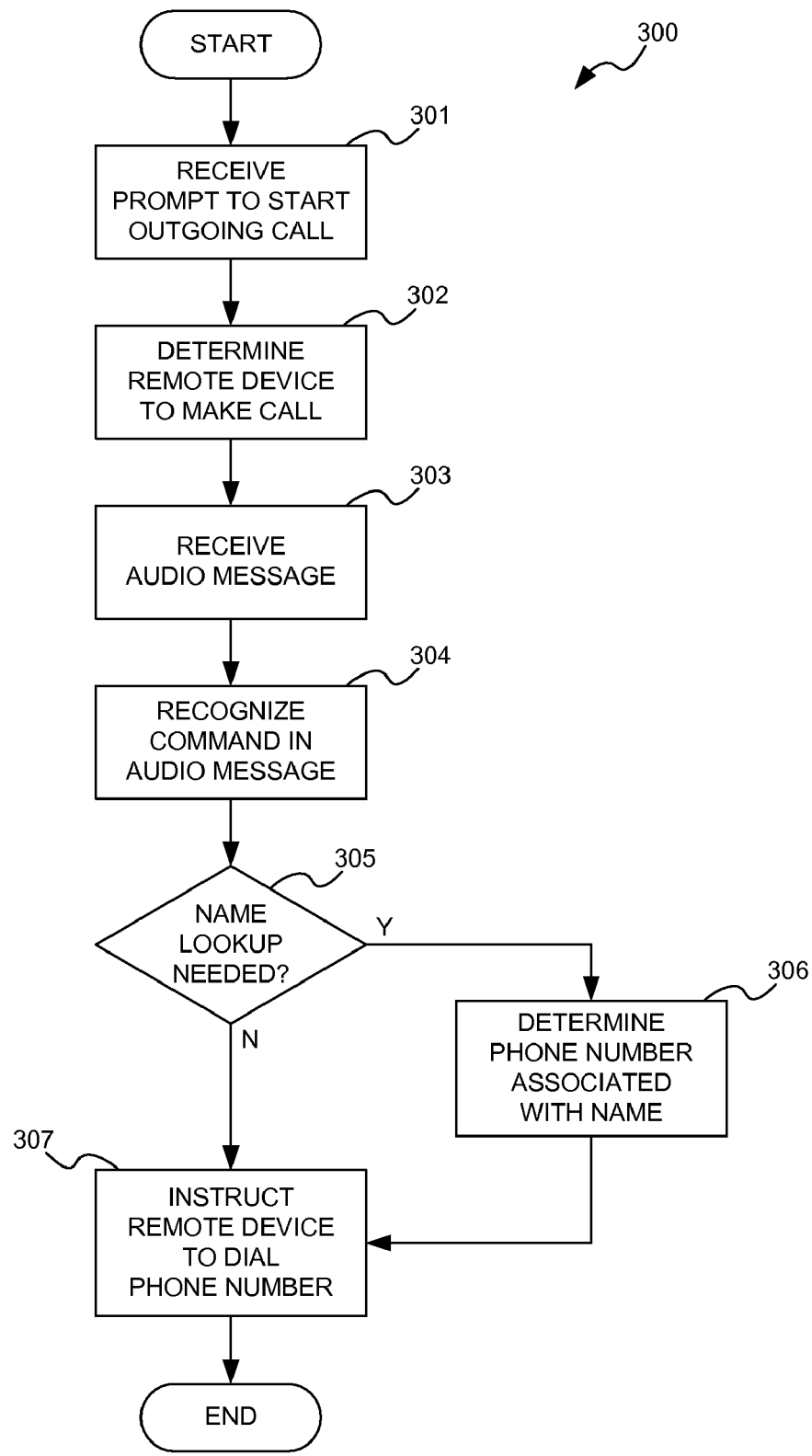
FIG. 3 is a flow chart illustrating an example of a method for initiating an outgoing phone call from a wireless telecommunications headset.

FIG. 3 is a flow chart illustrating an example routine 300 for initiating an outgoing communication, e.g., a phone call, from wireless telecommunications headset 101. The functional blocks displayed in this and other flowcharts are intended to suggest an order for completing a method. The blocks and their order, however, are not intended to provide the exact method for performing the method. Instead, functional blocks may be combined, split, reordered, added and removed.

In the example shown in FIG. 3, at operation 301, a prompt is received by wireless telecommunications headset 101 from user 201 to initiate an outgoing call. The prompt may be in the form of a button press, an audio command, or similar input. At operation 302, if multiple remote devices 202 are within range and appropriately authorized, headset 101 determines which of the devices to use to initiate the call. This determination may be based on pre-configured rules. An example of a rule may be to use home phone first, work phone second, cell phone third during daytime hours, but always use cell phone after 7 pm. Other rules are certainly configurable. Alternatively, the determination of a remote device may be made based on other factors, such as the relative strength of the wireless connection between headset 101 and each of remote devices 202. Headset 101 may use the remote device having the strongest signal. Another alternative is to have headset 101 select a remote device based on the phone number being dialed. For instance, certain numbers may need to go out over the work phone (e.g., international calls) while others go out over the cell phone (personal entries in an address book). Another alternative is to have user 201 select among the available remote devices. This selection may be made by audibly prompting user 201 to select a remote device 202 and awaiting a selection in the form of vocal or other input.

At operation 303, user 201 delivers an audio message which is received via microphone 105 and stored digitally in memory 104. The contents of the audio message are initially unknown to headset 101, but at operation 304, processor 102 performs speech recognition analysis on the stored audio message, achieving a level of recognition of what user 201 stated. A command may be recognized, such as "Dial 2 0 2 5 5 5 1 2 1 2," or "Dial Joe Smith Mobile." Such speech recognition techniques are widely known, and may require that user 201 have previously trained headset 101 as to the peculiarities of the user's voice.

At operation 305, should the recognized command require a phone number lookup, as with "Dial Joe Smith Mobile," then at operation 306, a phone number associated with the name in the command is determined. This number determination may be achieved by looking up the name in an address book stored in memory 104 within headset 101. This lookup may look for an exact match, or it may use phonetic approximation to find the name which sounds closest to the recognized command. The number determination may also be performed with the assistance of a remote device, with headset 101 communicating with a remote device 202, remote server 214, or other devices in communication with headset 101. This communication may supply a textual recognized command to a device which performs a lookup and returns an appropriate phone number or numbers. Communication with the helping remote device may also include other recognition candidates, which can be used as backup lookups should an initial lookup fail. A remote device may also assist with the speech recognition process, sharing the work involved in recognizing a command.

At operation 307, the resulting phone number is sent to one of the remote devices 202 in order that it be dialed and the call initiated, at which point user 201 can converse wirelessly with remote user 212. Once the remote device has been instructed to dial the phone number, routine 300 ends.

Figure 4:
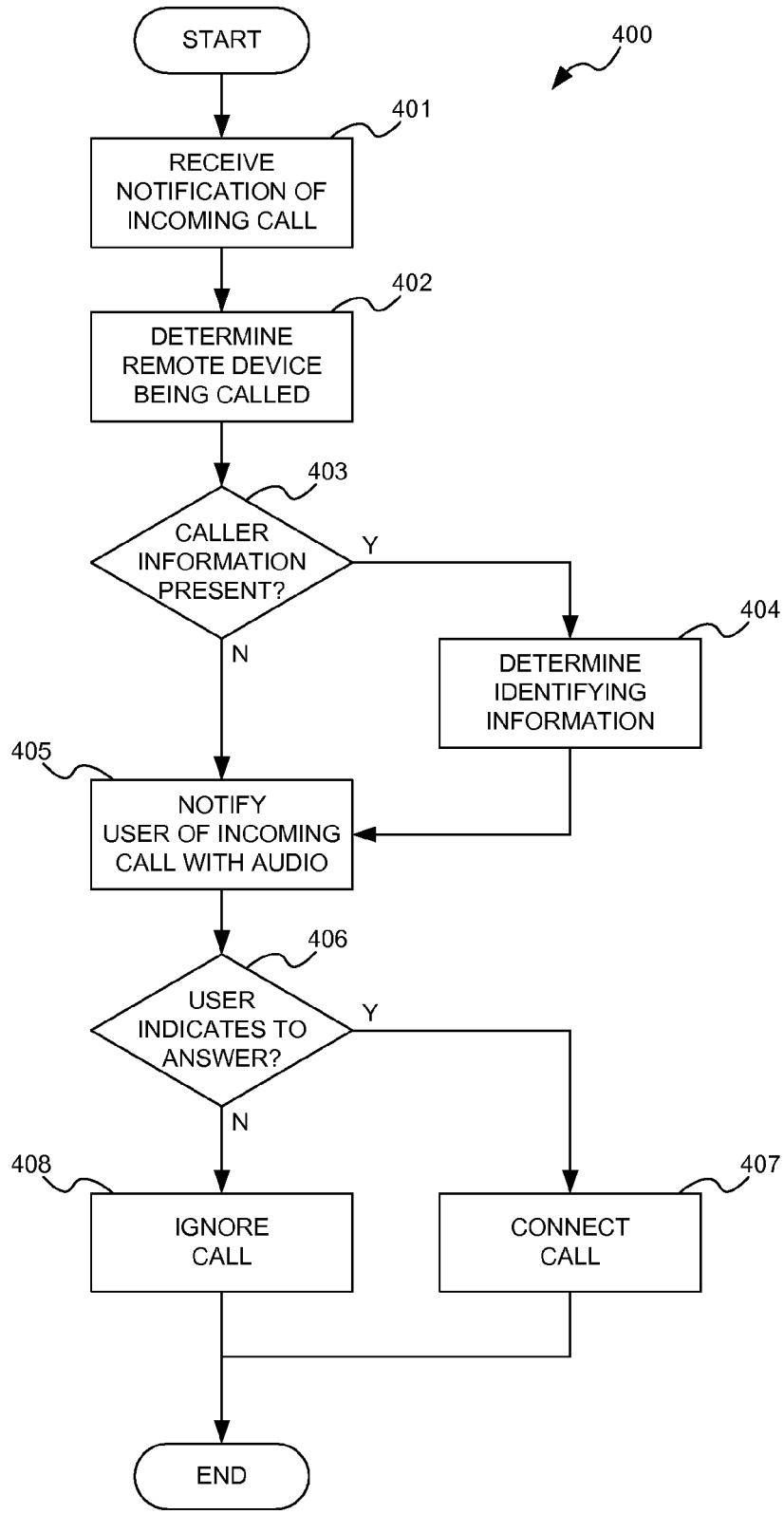
FIG. 4 is a flow chart illustrating an example of a method for receiving an incoming phone call using a wireless telecommunications headset.

FIG. 4 is a flow chart illustrating an example routine 400 for receiving an incoming communication, e.g., a phone call using wireless telecommunications headset 101. In the example shown in FIG. 4, at operation 401, headset 101 receives notification from a remote device of an incoming telephone call. Notification may include a generated voice announcing the incoming call or an audio prompt, such as a beep. At operation 402, the remote device initiating the notification is identified, and any conflicts with regard to multiple incoming calls with multiple devices are resolved. Resolution may involve a pre-configured priority, signal strength comparison, user selection, and/or any other method to select from among multiple incoming calls. At operation 403, caller information is detected as a part of the notification. If caller information is present, it may be used to determine identifying information at operation 404. This may involve identifying a calling phone number. In addition, a calling number may be used to perform a reverse look up in an address book in order to associate a name with the number. Determination of identifying information may use many of the same methods described with regard to FIG. 3 above. At operation 405, a text-to-speech algorithm may be used to convert incoming caller information and other information (e.g., information indicating an initiator of the communication or information indicating which device is being called) into an audio message for presentation to user 201 via speaker 106. For example, "Joe Smith is calling your cell phone," or "Your home phone is ringing with phone number 202-555-1212."

At operation 406, headset 101 waits to see if user 201 wants to take the incoming call. User 201 may signal his assent by speaking an audio command (e.g., "Pick Up"), or otherwise inputting his assent, at which point the call is connected at operation 407. Alternatively, user 201 may decline to take the call by waiting a set period of time, or speaking another audio command (e.g., "Ignore" or "Voice Mail"). If the user declines to answer the call at operation 408, it will be ignored, or headset 101 may inform the source remote device to ignore the call or send it to voice mail. If the call is accepted, then headset 101 picks up the call and conversation can occur normally. Once a call is connected or ignored, routine 400 ends.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A wireless telecommunications headset, comprising:
   a microphone for receiving an audio message;
   a memory for storing the audio message;
   a transceiver for communicating wirelessly with a first telephonic device and a second telephonic device without requiring user intervention to switch between the first and second telephonic devices;
   a processor for executing a plurality of instructions, wherein executing the plurality of instructions causes the processor to:
      recognize a command associated with the audio message, and
      execute the associated command, wherein executing the command includes communicating wirelessly with one of the first and second telephonic devices;
   a housing for enclosing the processor, the transceiver, and the microphone, and for wearing as a headset; and
   wherein the transceiver is for receiving at least one notification of an incoming communication call from one of the first and second telephonic devices, wherein the notification includes information identifying an initiator of the incoming communication call;
   wherein the wireless telecommunications headset is for providing an audio announcement that includes information identifying the initiator of the incoming communication call; and
   wherein the processor is configured to receive a response indicating whether the incoming communication call is to be answered, and is configured to answer the incoming communication call when the response is received.

2. The wireless telecommunications headset of claim 1, wherein recognizing a command associated with the audio message includes identifying a communications address based on the audio message.

3. The wireless telecommunications headset of claim 2, wherein the communications address is a telephone number, and identifying the communications address comprises:
   recognizing a set of digits comprising the telephone number; and
   composing the command using the set of digits.

4. The wireless telecommunications headset of claim 3, wherein executing the command further includes transmitting the set of digits to one of the first and second telephonic devices.

5. The wireless telecommunications headset of claim 1, wherein the audio message includes a search name, and recognizing a command associated with the audio message includes:
   searching for a found name approximating the search name in an address book stored in the memory.

6. The wireless telecommunications headset of claim 5, wherein the communications address is a telephone number, and executing the command further includes transmitting the found name to one of the first and second telephonic devices, wherein the found name is associated with a telephone number stored on the one of the first and second telephonic devices.

7. The wireless telecommunications headset of claim 5, wherein recognizing a command associated with the audio message further includes:
   determining a communications address associated with the found name; and
   composing the command using the communications address.

8. The wireless telecommunications headset of claim 1, further comprising:
   a prompting component for prompting the headset to receive the audio message when manually activated by a user.

9. The wireless telecommunications headset of claim 1, further comprising:
   a speaker for providing audio feedback pertaining to the command.

10. The wireless telecommunications headset of claim 1, wherein the communication is a telephone call, and the processor further:
    determines a name associated with information identifying the caller; and
    announces the name of the caller as part of the audio announcement.

11. The wireless telecommunications headset of claim 1, wherein the transceiver communicates using a Bluetooth® radio standard.

12. A method for handling a plurality of telephonic calls, the method comprising:
    associating a wireless headset with a first telephonic device;
    receiving a first signal to initiate a first outgoing communication at the wireless headset;
    receiving a first audio message from a user of the wireless headset;
    recognizing a first command in the first audio message at the wireless headset;
    forwarding the first recognized command wirelessly to the first telephonic device in order to initiate the first outgoing communication;
    enabling the user to participate in the first outgoing call via the wireless headset;
    associating the wireless headset with a second telephonic device without disassociating the wireless headset from the first communication device;
    receiving a second audio message;
    recognizing a second command in the second audio message at the wireless headset; and
    forwarding the second recognized command wirelessly to the second telephonic device in order to initiate a second outgoing communication.

13. The method of claim 12, further comprising:
    receiving notification of an incoming communication at the wireless headset from the first telephonic device;
    receiving identifying information associated with the incoming communication from the first telephonic device, wherein the identifying information identifies an initiator of the incoming communication;
    converting the identifying information to an audio message announcing the incoming communication at the wireless headset;
    playing the audio message for the user;
    receiving input from the user to answer the incoming communication; and
    enabling the user to participate in the incoming communication via the wireless headset.

14. The method of claim 13, wherein receiving input from the user includes receiving a signal from a mechanical button attached to the wireless headset.

15. The method of claim 12, further comprising:
    converting recognized speech in the first audio message into an identifier of a communications address in an address book at the wireless headset; and
    forming the first recognized command using the communications address.

16. The method of claim 15, wherein converting recognized speech in the first audio message into an identifier of a communications address comprises:
    isolating a search name from the audio message; and
    searching for a found name approximating the search name in the address book stored in the memory.

17. The method of claim 12, wherein forwarding a first recognized command wirelessly comprises transmitting the first recognized command using a Bluetooth® radio standard.

* * * * *